United States Patent
Foust et al.

(10) Patent No.: US 9,249,926 B1
(45) Date of Patent: Feb. 2, 2016

(54) STEEL ARM WITH INTERNAL TENDON

(71) Applicant: VALMONT, Omaha, NE (US)

(72) Inventors: Earl R. Foust, Birmingham, AL (US);
Fouad H. Fouad, Birmingham, AL (US)

(73) Assignee: Valmont, Omaha, NE (US)

( * ) Notice: Subject to any disclaimer, the term of this patent is extended or adjusted under 35 U.S.C. 154(b) by 0 days.

(21) Appl. No.: 14/679,055

(22) Filed: Apr. 6, 2015

Related U.S. Application Data

(60) Provisional application No. 61/977,131, filed on Apr. 9, 2014.

(51) Int. Cl.
*A47B 96/06* (2006.01)
*F16M 13/02* (2006.01)

(52) U.S. Cl.
CPC ........... *F16M 13/02* (2013.01); *F16M 2200/06* (2013.01); *F16M 2200/066* (2013.01)

(58) Field of Classification Search
CPC ... F16M 13/02; F16M 22/00; F16M 2200/06; F16M 2200/066
See application file for complete search history.

(56) References Cited

U.S. PATENT DOCUMENTS

| | | | |
|---|---|---|---|
| 617,062 A | 1/1899 | Taliaferro | |
| 1,959,172 A | 5/1934 | McIlrath | |
| 2,362,555 A | 11/1944 | Hubbard | |
| 3,399,746 A * | 9/1968 | Wood | E06C 9/04 182/100 |
| 6,595,323 B2 * | 7/2003 | Lindsey | E06C 9/04 182/92 |
| 6,704,991 B1 | 3/2004 | Coulborn | |
| 7,057,103 B1 | 6/2006 | Peabody | |
| 7,533,506 B2 * | 5/2009 | Platt | E04H 12/2261 52/296 |
| 8,191,332 B1 | 6/2012 | Semaan | |
| 2009/0212092 A1 | 8/2009 | Stol | |
| 2011/0272190 A1 | 11/2011 | Rouse | |

* cited by examiner

*Primary Examiner* — Amy Sterling
(74) *Attorney, Agent, or Firm* — Camoriano & Associates

(57) ABSTRACT

A tensioning arrangement uses a tendon to pull together (prestress) a hollow steel arm and a bracket in a localized area around the joint between the arm and the bracket in order to induce localized compressive stresses that will reduce the wind-induced, intermittent tensile stresses and hence minimize fatigue at the joint between the arm and the bracket.

15 Claims, 6 Drawing Sheets

US 9,249,926 B1

STEEL ARM WITH INTERNAL TENDON

This application claims priority from U.S. Provisional Application Ser. No. 61/977,131 filed Apr. 9, 2014.

BACKGROUND

Steel power transmission poles have steel arms to support electric conductors. The steel arms are often tubular in cross section with varying lengths that may reach 20 feet or greater. The steel arms project horizontally from the steel poles. The steel poles also have shorter steel arms, typically located at the very top of the pole, to support the ground wires, also referred to as the shield or static wire arms. Each of the steel arms is made of a steel shell (tube) and has a hollow interior. The steel arms are welded to a bracket, which is then bolted to steel plates that are welded to the steel pole. The tubular steel arms can be tapered or non-tapered.

Wind loads on these arms can cause the arms to vibrate. The repeated flexing at the welded joint creates fatigue stresses, which may cause fatigue cracking at the welded joint. In order to address this problem, the practice has been to secure the arms to the pole with tie down cables immediately upon installation. Also, the specifications for welding the arms to the brackets require a substantial weld which requires a substantial expenditure of time and material for the welding process.

SUMMARY OF THE INVENTION

The purpose of the present invention is to greatly reduce the flexural tensile stresses that occur at the joint of the arm and the bracket in order to reduce or eliminate the problem of fatigue cracking or failure at the joint. This is accomplished by providing a localized prestressing arrangement that includes a short tendon that puts the joint in compression, so that localized compression stresses are created in the critical area of the joint to counteract the high tension stresses caused by the wind induced vibration causing flexing of the steel arm.

DESCRIPTION

Figure 1:
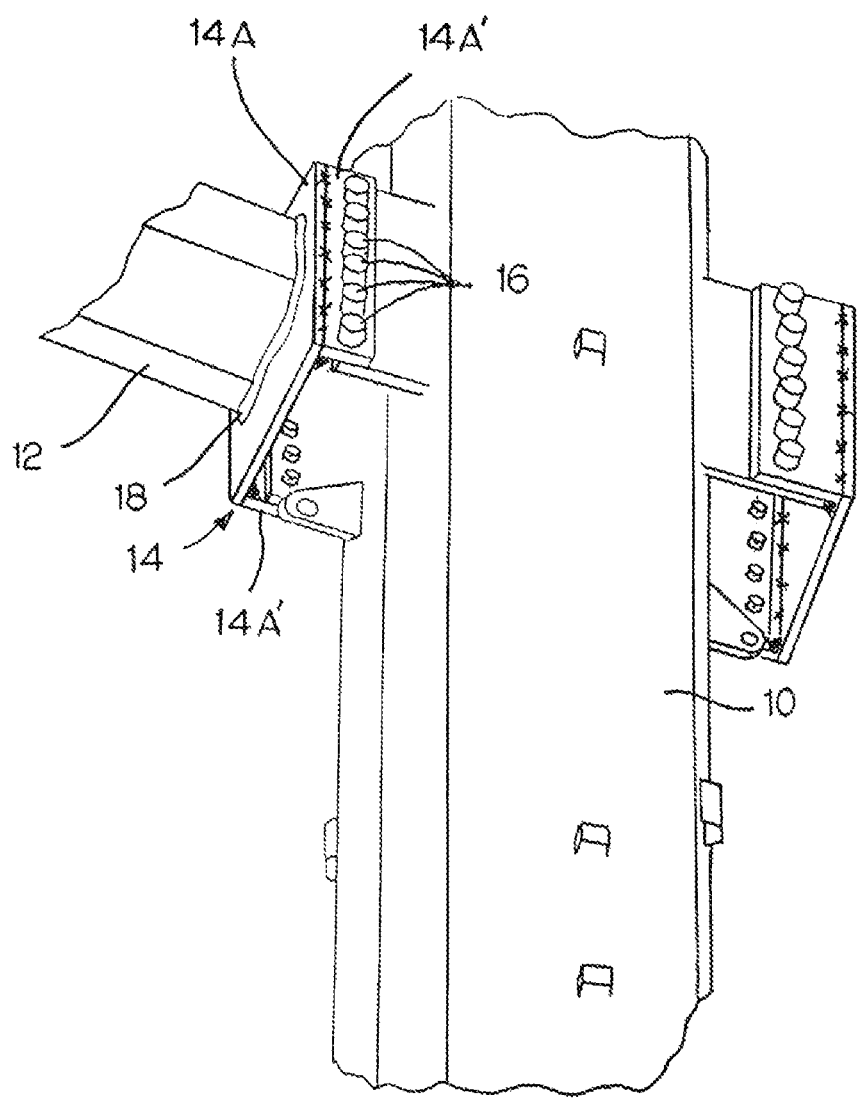
FIG. 1 is a broken-away, perspective view of a steel electric power transmission pole with a horizontal steel transmission arm welded to a bracket which is in turn bolted to steel plates welded to the steel pole.

FIG. 1 shows a steel pole 10 with a horizontal arm 12 projecting from the pole 10. (The arm has a rise but is generally referred to as being horizontal.) The arm 12 also is made of steel. The arm 12 is welded to a bracket 14 along a joint 18 which extends around the perimeter of the proximal end of the arm 12. The bracket 14 is bolted to the pole 10 by means of bolts 16 which extend through holes 16A in the bracket 14 (See FIG. 2). As shown in FIG. 1, there may be a second arm mounted on the opposite side of the pole 10 in the same manner. There may be additional horizontal steel arms mounted at other positions on the pole 10 at various elevations as well.

The arm 12 and bracket 14 are symmetrical about an imaginary vertical plane.

Figure 2:
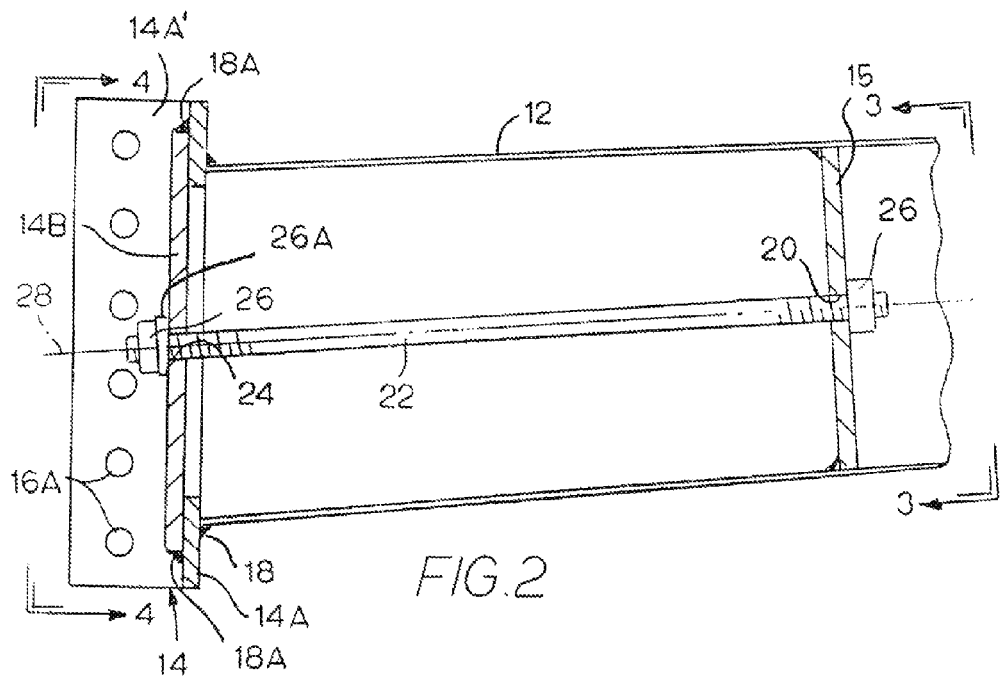
FIG. 2 is a section view through the transmission arm and bracket, taken from the back side of FIG. 1, with the arm broken away, and showing the internal tensioning mechanism.
Figure 3:
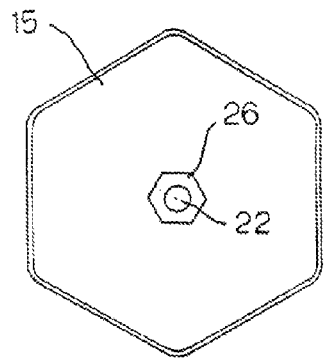
FIG. 3 is a view taken along the section 3-3 of FIG. 2.
Figure 4:
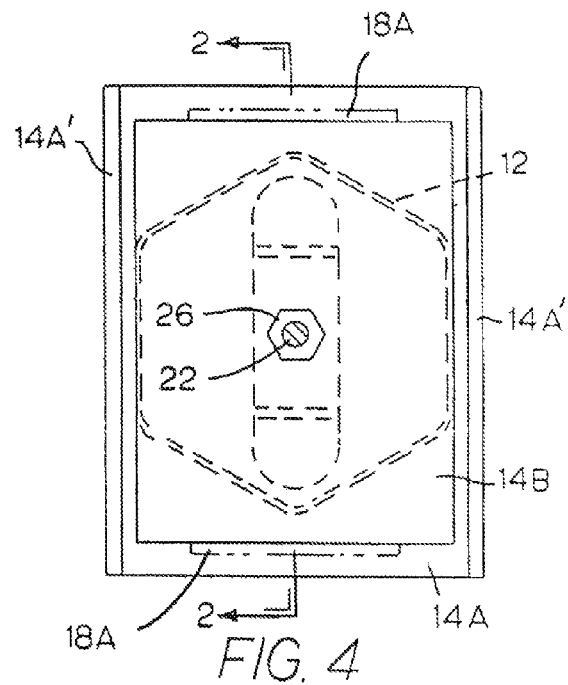
FIG. 4 is a view taken along the section 4-4 of FIG. 2.

FIGS. 2-4 show the details of the arm 12 and bracket 14 which include a pre-stressing mechanism that puts the joint 18 in compression in order to reduce or eliminate the flexural tensile stresses, induced by wind induced vibrations, occurring in the vicinity of the joint 18.

As shown in FIG. 2, this particular bracket 14 is made of plates welded together, with a first plate 14A welded to the proximal end of the arm 12 around substantially the entire perimeter of the arm 12 at the welded joint 18, and a second plate 14B, welded to the back of the first plate 14A along the welded joints 18A (See also FIG. 4) at the top and bottom of the second plate 14B. The portions 14A' of the bracket 14 that have the bolt holes 16A are made up of two plates welded at right angles to the portion of the first plate 14A that is welded to the proximal end of the arm 12 at the welded joint 18. The two plates 14A and 14B function together as the base plate for securing the arm 12 to the bracket 14 and for tensioning the arm 12. The bracket 14 alternatively could be made as one piece from cold bent steel by bending a single plate 14A, and reinforcing plates could be added as desired.

The pre-stressing mechanism includes a steel plate 15, which is welded to the inside of the arm 12 at a desired axial distance from the joint 18. That axial distance (the length of the tendon 22 between the bracket 14 and the internal steel plate 15) preferably is from 1.5 to 3 times the outside diameter of the arm 12 at the joint 18 in order to provide a localized prestress that induces compressive stresses at the joint 18.

In FIGS. 2-4, the plate 15 is substantially perpendicular to the longitudinal axis 28 of the arm 12. In this embodiment, the tendon 22 is a threaded rod. The tendon 22 alternatively could be a cable or other linear tensioning member. The proximal end of the tendon 22 bears against the bracket 14, and the distal end of the tendon 22 bears against the plate 15. The tendon 22 extends through a central through opening 24 in the plate 14B of the bracket 14 and through a central through opening 20 in the plate 15 and is tensioned by means of nuts 26 at both the distal and proximal ends. There is a beveled washer 26A between the plate 14B and the nut 26 at the proximal end, which compensates for the angle between the plane of the plate 14B and the axis 28 of the tendon 22 being slightly off of perpendicular. The beveled washer 26A provides a surface that is perpendicular to the axis 28 of the tendon 22, and the proximal nut 26 bears against that surface. The distal nut 26 is welded to and bears against the plate 15, and the proximal nut 26 bears against the plate 14B of the bracket 14. (As an alternative, instead of using the distal nut 26, the through opening 20 in the plate 15 could be threaded.)

The openings 20, 24 are aligned along the central axis 28 of the arm 12, so the tendon 22 provides an axial tensioning force, pulling the arm 12 and bracket 14 together in the axial direction and thus inducing axial compression.

This axial compression greatly reduces the flexural tensile stresses at the joint 18 induced by flexing of the arm 12 due to wind induced vibration (depicted schematically by the arrow 30 of FIGS. 5 and 10) thereby greatly reducing or eliminating fatigue cracking/failure at the joint 18.

Figure 5:
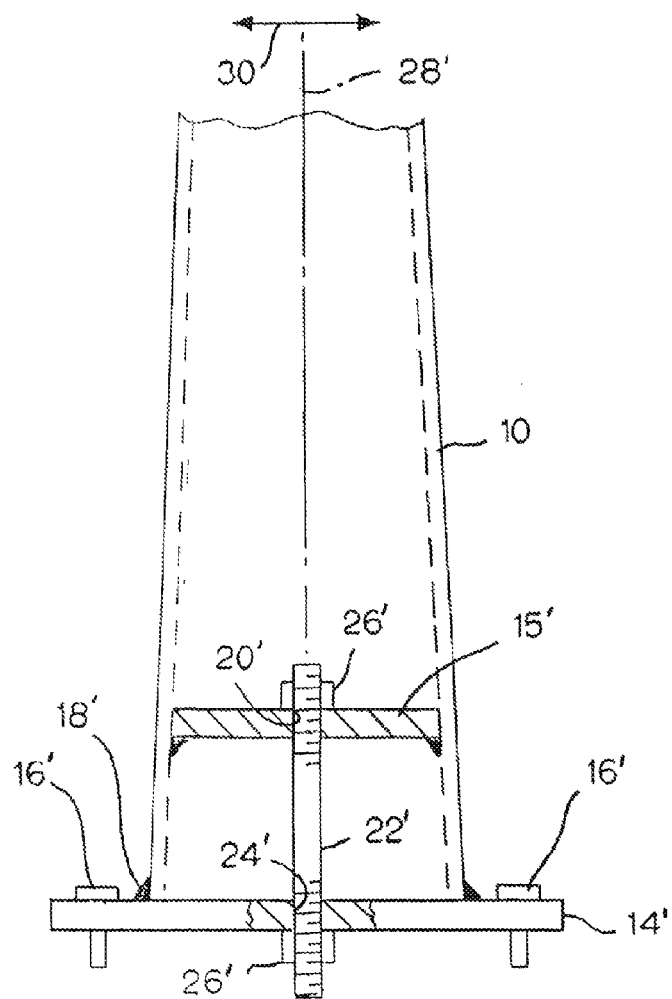
FIG. 5 shows an alternative embodiment in which the tensioning arrangement of FIGS. 1-4 is used to provide tension between a vertical steel pole and a horizontal base plate.

FIG. 5 shows an alternate embodiment in which a similar tensioning mechanism is used to provide axial tension between a vertical steel pole or arm 10 and a bracket that includes a horizontal base plate 14', which secures the pole or arm 10 to a foundation (not shown) by means of bolts 16'. The pole 10 is welded to the horizontal base plate 14' at the welded joint 18'. As with the first embodiment, this embodiment is symmetrical about an imaginary vertical plane. In this case, the tendon 22' provides tension along the vertical axis 28' of the pole 10, putting the joint 18' between the pole 10 and base plate 14' in compression. A horizontal steel plate 15' is welded to the inside of the pole 10, and through openings 20' and 24' in the plate 15' and base plate 14', respectively, are aligned along the vertical axis 28' of the pole 10 and receive a threaded rod 22', which threads into the nuts 26' at both ends to tension the threaded rod 22'. The distal nut 26' preferably is welded to the plate 15' to prevent it from spinning as the threaded rod 22' is threaded into the nut 26'. The length of the rod 22' (the tendon) between the base plate 14' and the internal plate 15' preferably is between one and three times the outside diameter of the pole 10 at the joint 18' between the pole 10 and the base plate 14'. Again, this tensioning arrangement pulls the pole 10 and base plate 14' together in the axial direction, putting the localized area around the joint 18' in compression. This reduces the flexing in the area of the joint 18' and thereby reduces the induced tensile stresses in the area of the joint 18' as the majority of the pole 10 flexes relative to the base plate 14', thereby reducing or eliminating the problem of fatigue at the joint 18'.

By putting the localized area of the joint between the pole/arm and the bracket in compression in this manner, it may be possible to use a much simpler and less expensive weld at the joint or even to completely eliminate the need for a weld at the joint. If the weld were eliminated, the arm and bracket would be secured together by compression alone.

Figure 6:
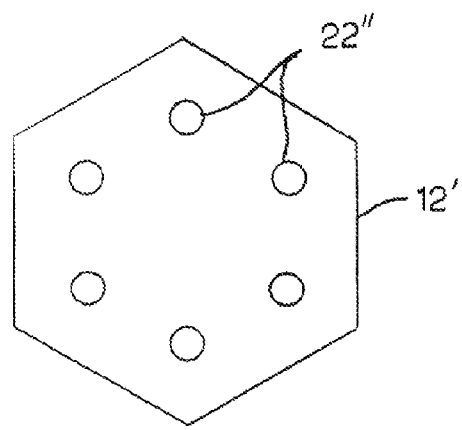
FIG. 6 is a view, similar to FIG. 3, showing an alternative embodiment that uses several tensioning rods.

While these embodiments show a single tendon aligned with the axis of the arm, it would be possible to use one or more tensioning rods or tendons 22" (See FIG. 6) which is (or are) offset from the axis of the arm 12' and still apply a localized tensioning force in the axial direction. The tensioning rods (or tendons) 22" in FIG. 6 are concentrically arranged, but various other eccentric arrangements, or an arrangement that includes offset tendons and an axial tendon could be used as well to induce compressive stressed at the most desired locations, and the number of tendons may be one or more, as desired.

Figure 7:
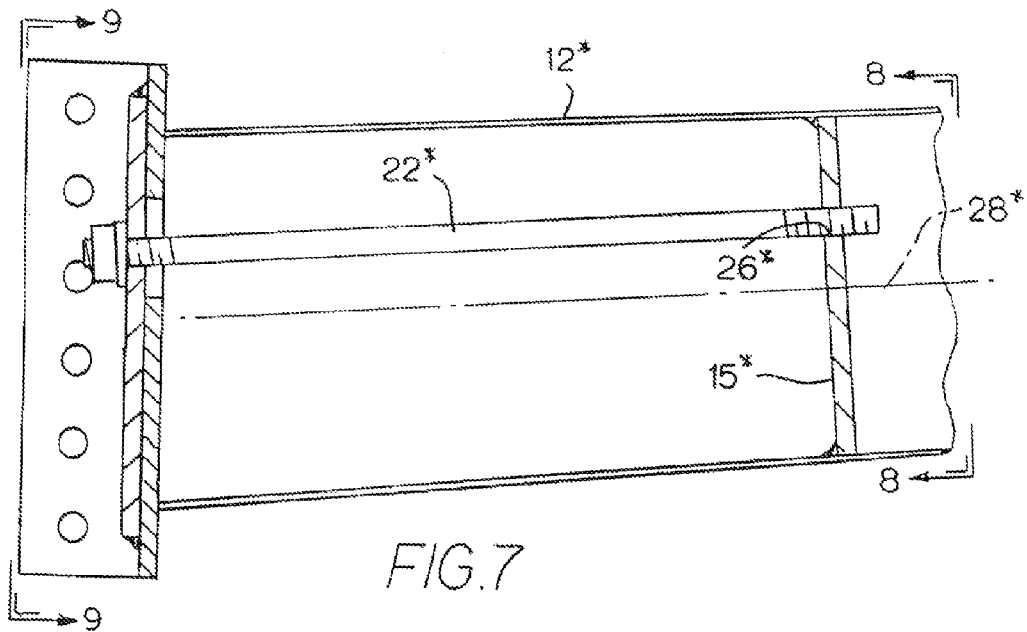
FIG. 7 is a view similar to FIG. 2 but showing another alternative embodiment, with eccentric tensioning mechanisms.
Figure 8:
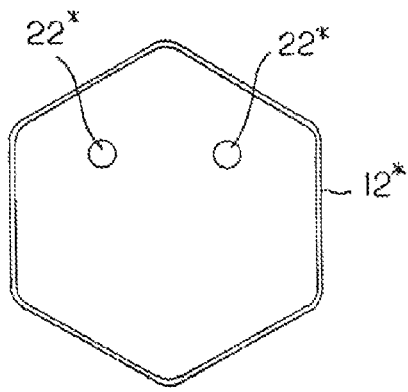
FIG. 8 is a view taken along the section 8-8 of FIG. 7.
Figure 9:
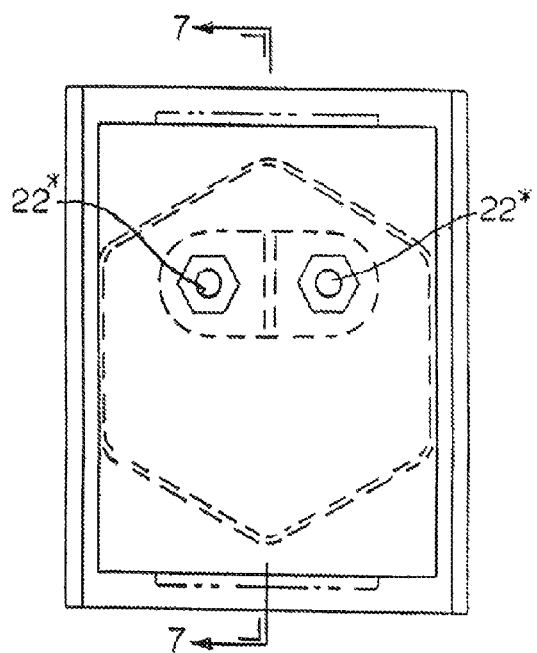
FIG. 9 is a view taken along the section 9-9 of FIG. 7.

FIGS. 7-9 show an example of an eccentric arrangement which is similar to the first embodiment, shown in FIGS. 2-4, but in which two tendons 22* are located above the central axis 28* of the arm 12*. In this embodiment, instead of having a nut welded to the plate 15*, the openings in the plate 15* are threaded, and the threaded rods 22* are threaded into those threaded openings.

Figure 10:
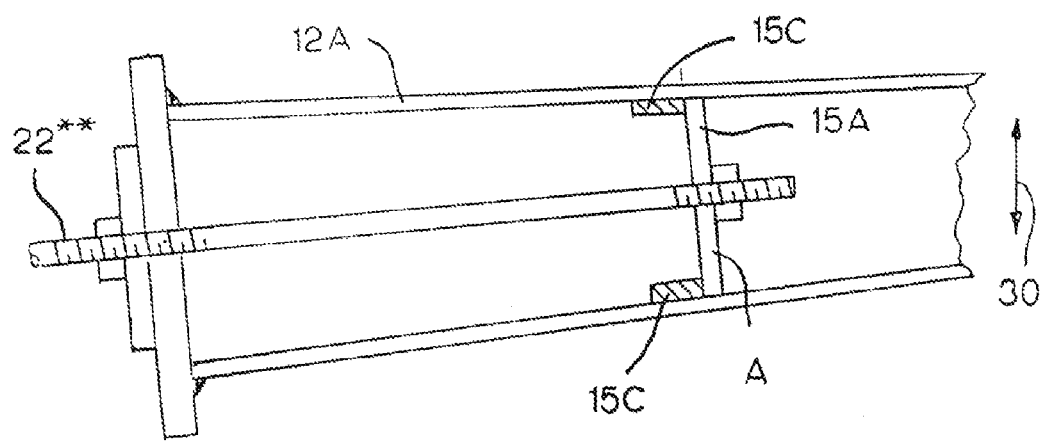
FIG. 10 is a view similar to FIG. 2 but showing another alternative embodiment.

FIG. 10 shows another alternative embodiment, which is similar to the embodiment of FIG. 2 except that, instead of welding the plate 15A to the inside of the pole 12A, a ring 15C (or a series of blocks or lugs or abutments) is secured (as by welding or bolting, for instance) to the interior of the pole 12A, and the plate 15A is secured to the pole 12A by compression force, with the tendon 22** causing the plate 15A to bear against the ring 15C (or blocks or lugs or abutments).

Figure 11:
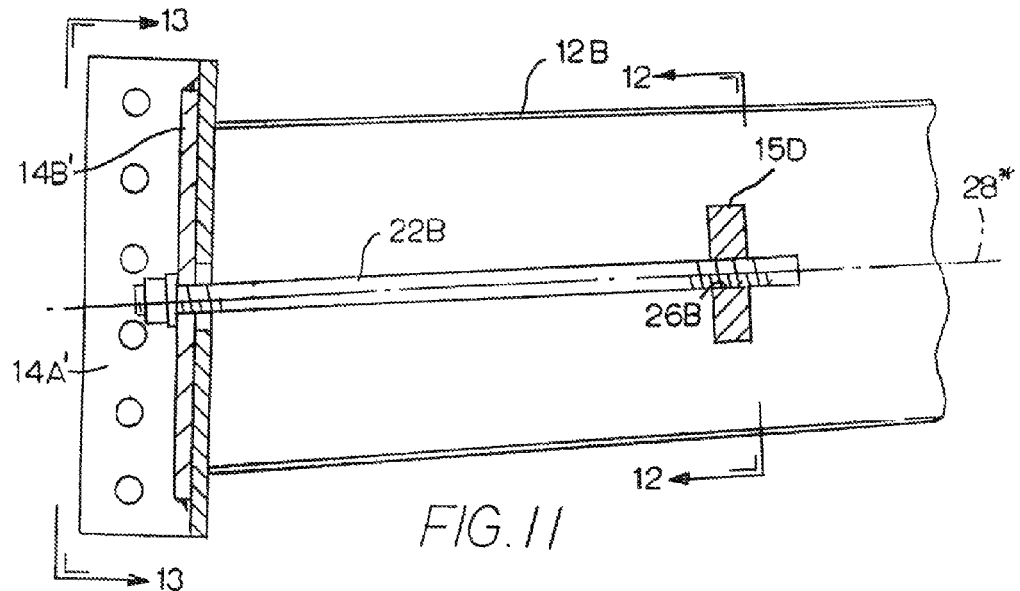
FIG. 11 is a view similar to FIG. 2 but showing another alternative embodiment.
Figure 12:
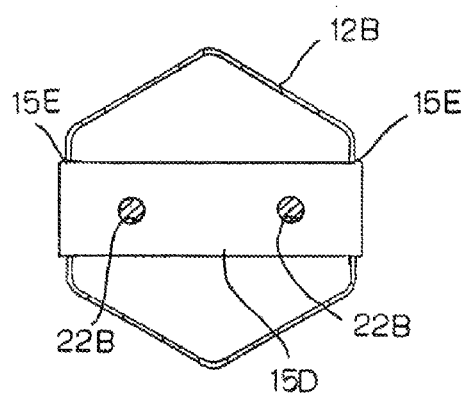
FIG. 12 is a view taken along the section 12-12 of FIG. 11.
Figure 13:
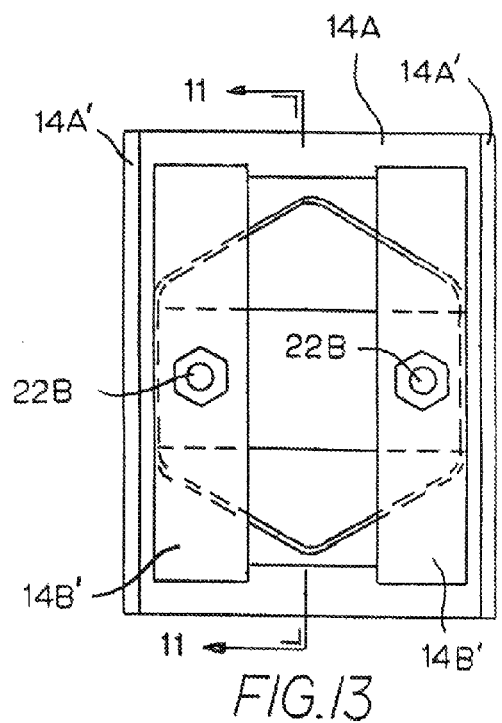
FIG. 13 is a view taken along the section 13-13 of FIG. 11.

FIGS. 11-13 show another alternative embodiment, in which the interior plate 15D projects through rectangular openings 15E in the wall of the arm 12B, so the interior plate 15D is not only welded to the wall of the arm 12B but bears directly against the edges of the openings 15E. The edges of the openings 15E against which the interior plate 15D bears lie in an imaginary plane that is perpendicular to the axis 28* of the tendon 22B. In this arrangement, the weld between the interior plate 15D and the wall of the arm 12B may be omitted if desired. In this embodiment, the tendons 12B lie on opposite sides of the axis 28* of the arm 12B and are equally spaced from the axis 28*. The openings 26B in the interior plate 15D are threaded, so the threaded rods 22B thread into those threaded openings 26B.

The bracket in this embodiment differs from the first embodiment in that, instead of a single plate 14B, there are two separate plates 14B', both of which are welded onto the plate 14A.

It will be obvious to those skilled in the art that modifications may be made to the embodiments described above without departing from the scope of the invention as claimed.

What is claimed is:

1. A tensioning arrangement, comprising:
a wall defining a hollow steel arm having a proximal end and an interior surface, said proximal end defining an outside diameter, and said arm defining a longitudinal axis;
a bracket secured to said arm at said proximal end, said bracket having an inner surface and an outer surface opposite the inner surface, with the proximal end of said hollow steel arm abutting said bracket on the inner surface of said bracket, and said bracket defining a plurality of bolt holes;
an interior plate secured on the inside of said arm; and
a first tendon secured to said interior plate and to said bracket, said first tendon defining a first tendon axis and applying a linear tensioning force pulling the interior plate and bracket toward each other, wherein said interior plate is located an axial distance from said proximal end of said arm that is between 1 and 3 times said outside diameter.

2. A tensioning arrangement as recited in claim 1, wherein said interior plate is secured directly to said interior surface of said wall.

3. A tensioning arrangement as recited in claim 1, and further comprising at least one abutment attached to the interior surface of said wall, wherein said interior plate bears against said abutment.

4. A tensioning arrangement as recited in claim 1, wherein said wall defines opposed openings having edges, and said interior plate projects through said opposed openings and bears against said edges.

5. A tensioning arrangement as recited in claim 1, wherein the interior plate defines a threaded hole, and said first tendon is threaded into said threaded hole.

6. A tensioning arrangement as recited in claim 1, wherein said first tendon axis lies substantially along said longitudinal axis.

7. A tensioning arrangement as recited in claim 1, wherein said first tendon axis is offset from said longitudinal axis.

8. A tensioning arrangement as recited in claim 1, and further comprising at least a second tendon secured to said interior plate and to said bracket, said second tendon defining a second tendon axis and applying a linear tensioning force pulling the interior plate and bracket toward each other.

9. A tensioning arrangement as recited in claim 8, wherein both said first and second tendon axes are offset from said longitudinal axis.

10. A tensioning arrangement as recited in claim 9, wherein said first and second tendon axes are located an equal distance away from said longitudinal axis.

11. A tensioning arrangement as recited in claim 1, wherein the outer surface of said bracket is not at right angles to the first tendon axis, and further comprising a beveled washer adjacent to the outer surface of said bracket which provides a surface at right angles to the first tendon axis.

12. A tensioning arrangement as recited in claim 11, wherein said first tendon is a threaded rod, and further comprising a nut which threads onto said threaded rod and bears against said beveled washer to secure the first tendon to the bracket.

13. A tensioning arrangement as recited in claim 1, wherein said bracket is mounted on a vertical pole, with said arm projecting horizontally from said vertical pole.

14. A tensioning arrangement as recited in claim 1, wherein said bracket is mounted on a foundation, with said arm extending vertically from said foundation.

15. A tensioning arrangement as recited in claim 4, wherein said first tendon is a threaded rod, and the outer surface of said bracket is not at right angles to the axis of said first tendon, and further comprising a beveled washer adjacent to the outer surface of said bracket which provides a surface at right angles to said first tendon axis; and a nut which threads onto said threaded rod and bears against said beveled washer to secure the first tendon to the bracket; wherein said bracket is mounted on a vertical pole, with said arm projecting horizontally from said vertical pole.

* * * * *